United States Patent [19]

O'Sullivan et al.

[11] Patent Number: 4,856,848
[45] Date of Patent: Aug. 15, 1989

[54] MANUAL HEADREST

[75] Inventors: Terence J. O'Sullivan, Sterling Height; George W. Mould, Utica; David E. Armstrong, Rochester; Graham S. Foulkes, Sterling Height; Michael B. Davis, Bloomfield Hills, all of Mich.

[73] Assignee: General Motors Corporation, Detroit, Mich.

[21] Appl. No.: 213,668

[22] Filed: Jun. 30, 1988

[51] Int. Cl.$^4$ ............................................. A47C 7/36
[52] U.S. Cl. ................................... 297/391; 297/409
[58] Field of Search ............... 297/409, 408, 410, 356, 297/391

[56] References Cited

U.S. PATENT DOCUMENTS

| | | | |
|---|---|---|---|
| 652,001 | 6/1900 | Keil | 297/356 X |
| 1,471,168 | 10/1923 | Katz | 297/409 X |
| 1,746,091 | 2/1930 | Skidmore | 297/409 X |
| 2,828,810 | 4/1958 | Barecki et al. | 297/408 X |
| 4,191,422 | 3/1980 | Inasawa et al. | 297/409 X |
| 4,265,482 | 5/1981 | Nishimura et al. | 297/409 X |
| 4,640,549 | 2/1987 | Yokota | 297/408 X |
| 4,674,797 | 6/1987 | Tateyama | 297/408 |
| 4,762,367 | 8/1988 | Denton | 297/409 |

Primary Examiner—Francis K. Zugel
Attorney, Agent, or Firm—Ernest E. Helms

[57] ABSTRACT

The present invention in a preferred embodiment provides an apparatus and method of utilization there of of a fore and aft adjustable vehicle seat headrest. The headrest includes a base providing means of attachment of the headrest to said vehicle seat. A frame is connected with the base. A cushion support with an attached shaft is slidably mounted with the frame for fore and aft movement. The shaft has a series of unidirectional cam slots. A spring biases the cushion support to a rearward position with respect to the frame. Levers pivotally connected with the frame engage with the shaft slots to set the position of the headrest. Release means are provided to remove the levers and retain the levers from reengagement with the slots upon extreme forward movement of the cushion support thereby allowing the spring to return the cushion support to an extreme rearward position. Additionally, means are provided to reengage the levers with the slots whereby the cushion support is reset in the extreme rearward position.

8 Claims, 7 Drawing Sheets

MANUAL HEADREST

FIELD OF THE INVENTION

The field of the present invention is that of vehicle seat headrests.

DISCLOSURE STATEMENT

It has been known to provide headrests in the seats of automotive vehicles An example of a powered vehicle headrest is shown and illustrated in Mabew et al, Ser. No. 901,639 filed Aug. 28, 1986. Another vehicle seat headrest is shown and illustrated in Denton, Ser. No. 006,791 filed Jan. 27, 1987.

The present invention provides an alternative to the above referenced commonly assigned inventions.

SUMMARY OF THE INVENTION

The present invention provides a vehicle seat headrest which can be adjusted by utilizing only one hand of the vehicle seat occupant.

It is an object of the present invention to provide a vehicle seat headrest and a method of utilization thereof.

It is an object of the present invention to provide a manual fore and aft longitudinally adjustable vehicle seat headrest, the headrest including a base providing means of attachment of the headrest to the vehicle seat, a frame connected with the base, a cushion support providing a cranial contact surface, the cushion support further including an attached shaft, the shaft being slidably mounted with the frame for forward and rearward movement, the shaft having a series of unidirectional cam slots, spring means biasing the cushion support to an extreme rearward position with respect to the frame, lever means connecting with the frame for engagement with the shaft slots to set the position of the headrest, release means to remove the lever and retain the lever from reengagement with the slots upon extreme forward movement of the cushion support thereby allowing the spring to return the cushion support to the extreme rearward position, means to reengage the lever with the slots whereby the cushion support is reset in the extreme rearward position.

It is an object of the present invention to provide a fore and aft adjustable vehicle seat headrest, the headrest including a base providing means of attachment of the headrest to the vehicle seat, a frame connected with the base, a cushion support providing a cranial contact surface, the cushion support further including an attached shaft, the shaft being slidably mounted to the frame for forward and rearward movement, the shaft having a series of unidirectional cam slots and a longitudinal slot, and the cushion support having attached thereto front and rear ramp surfaces, spring means biasing the cushion support to a rearward position with respect to the frame, lever means having front and rear ramp surfaces, the lever being slidably connected with the frame for engagement with the shaft unidirectional slots to set the position of the headrest whereby movement of the cushion support to an extreme forward position causes the lever to be disengaged from the unidirectional slots and for the cushion support rear ramp surface to engage with the lever front ramp surface to move the cushion support cause the lever to be placed into the longitudinal slot allowing the spring to position the cushion support in an extreme rearward position whereupon the cushion support front ramp surface engages with the lever front ramp surface to move the cushion support to a position wherein the lever reengages with the unidirectional slots whereby the cushion support is reset in the extreme rearward position.

It is an object of the present invention to provide a method of adjusting the fore and aft position of a vehicle seat headrest with respect to a vehicle seat, the method including connecting a base of the headrest with the vehicle seat, connecting a headrest frame with the base, slidably mounting to the base a cushion support having an attached shaft, the shaft having a series of unidirectional cam slots, biasing said cushion support to a rearward position with respect to the frame, connecting with the frame lever means for engagement with the shaft cam slots to set the fore and aft position of said cushion support, releasing the lever from engagement with the cam slots and retaining from reengagement therewith upon extreme forward movement of the cushion support thereby allowing the cushion support to be returned by the spring to an extreme rearward position, and reengaging the lever with the cam slots whereby the cushion support is reset in an extreme rearward position.

Further objects and desires of the present invention can become more apparent to those skilled in the art as the nature of the invention is better understood from the and detailed description.

DETAILED DESCRIPTION OF THE DRAWINGS

Figure 1:
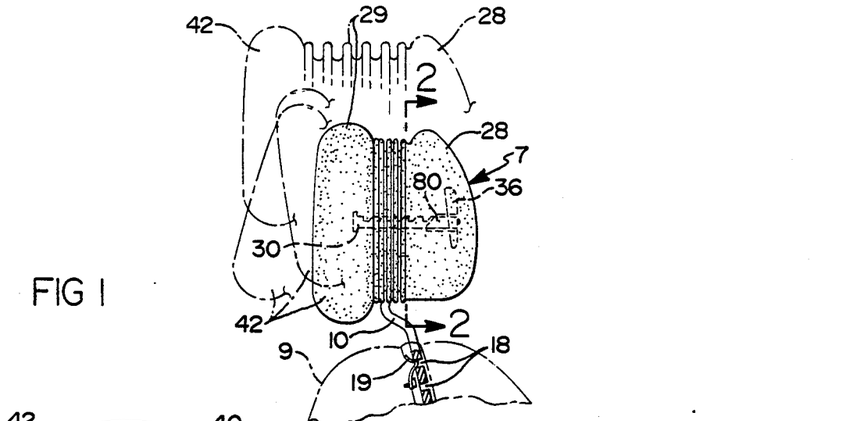
FIG. 1 is a side elevational view of a preferred embodiment vehicle seat headrest of the present invention.

Referring to FIGS. 1, the manual vehicle seat headrest 7 of the present invention has adjustment generally in six directions with respect to the vehicle seat 9. The headrest can be adjusted vertically with respect to the vehicle seat 9. There is also provided means for angular (pivotal) adjustment of vehicle sea headrest 7 with respect to the vehicle seat 9. The vehicle seat headrest 7 can also be adjusted in a fore and aft direction with respect to the vehicle seat 9.

Figure 2:
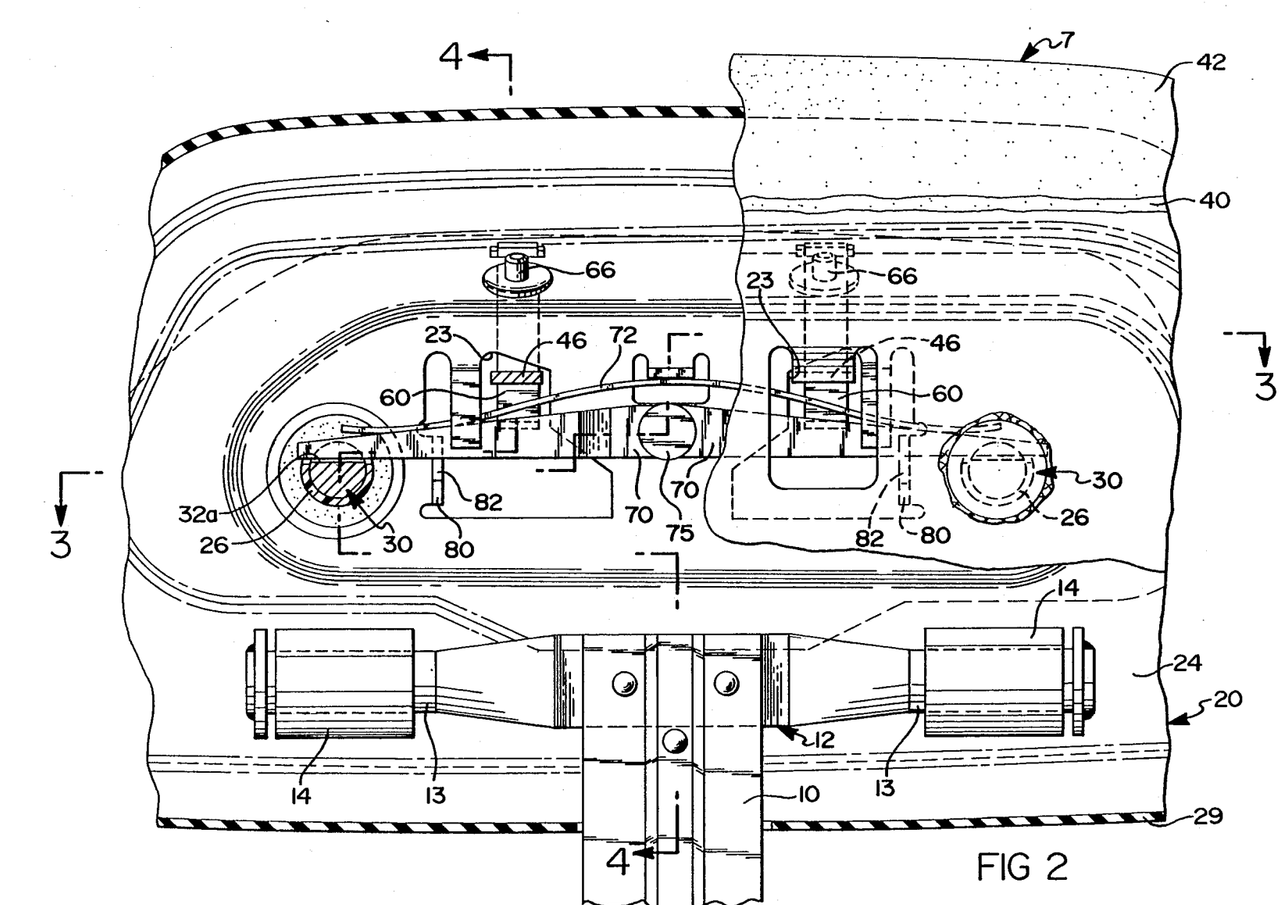
FIG. 2 is a view along line 2—2 of FIG. 1.
Figure 3:
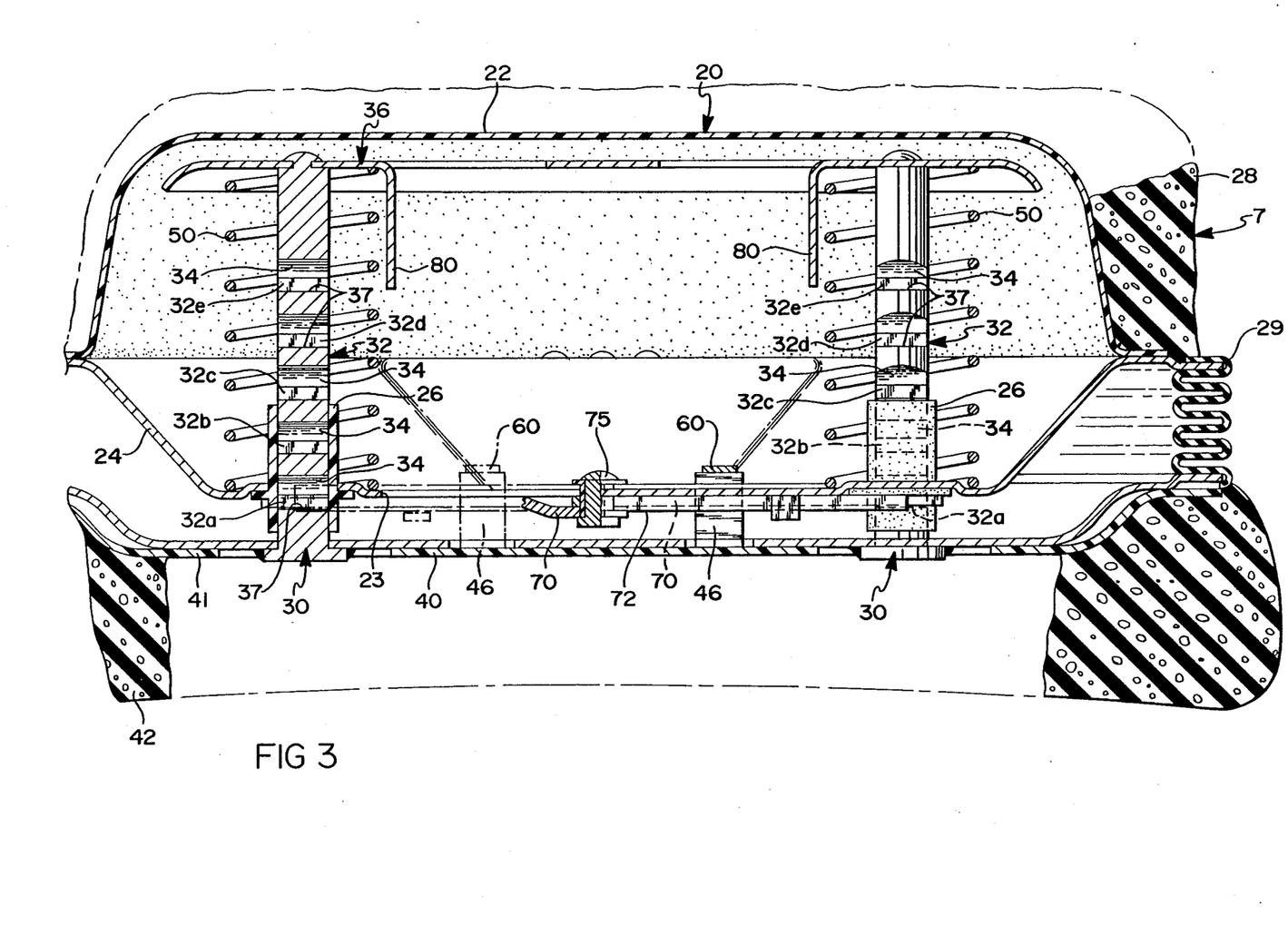
FIGS. 3 and 4 are views taken along lines 3—3 and 4—4 respectively of FIG. 2.
Figure 4:
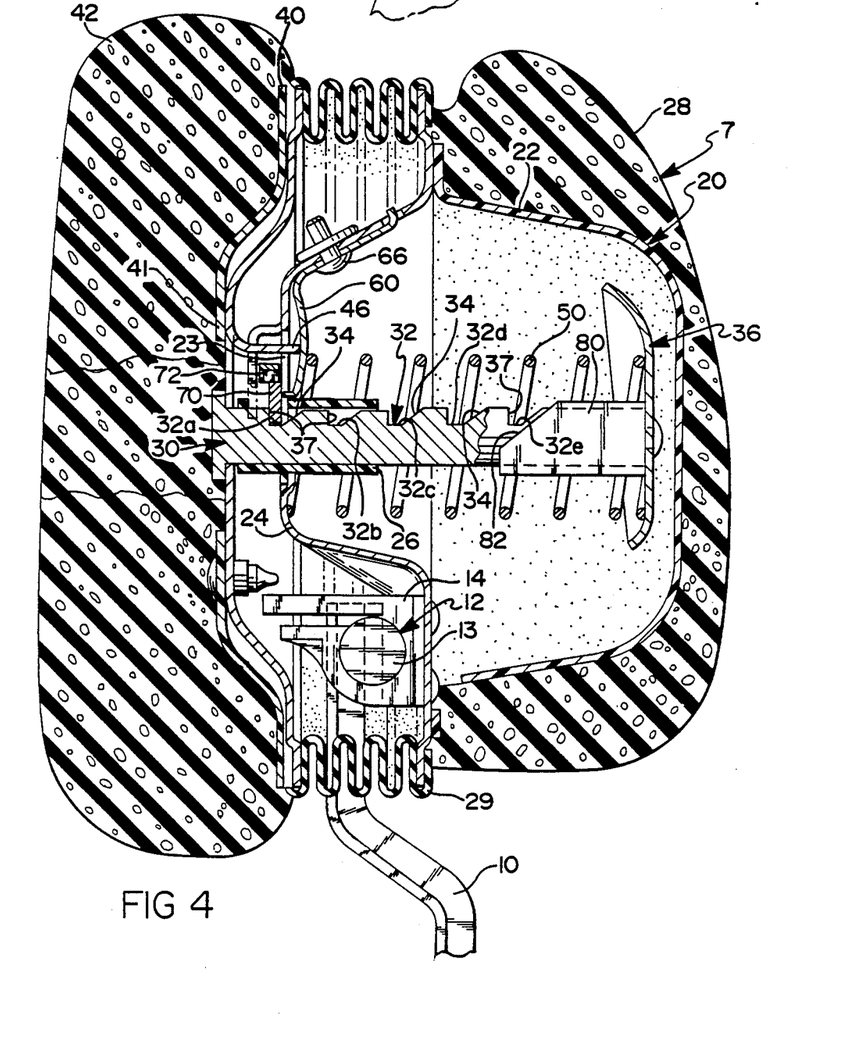

Referring additionally to FIGS. 2, 3, and 4, a post 10 provides a base and means of attachment of the headrest 7 to the vehicle seat 9. The post has means of vertical adjustment with respect to a slot in the vehicle seat 9 and as illustrated is incrementally held in its vertical position by a click stop adjustment mechanism 19 or a mechanism similar to that described in copending patent application Duvenkamp REVERSIBLE HEADREST FOR A VEHICLE SEAT, ESPECIALLY FOR THE REAR SEAT OF A SALOON CAR, Ser. No. 065,490 filed June 23, 1987. However, if desired, the post 10 can utilize a frictional engaging type adjustment mechanism.

The post 10 has fixably connected thereto a cross bar 12. Pivotally mounted by frictional engagement on circular ends 13 of the cross bar 12 by bearings 14, is a frame 20. The frame 20 has a rear portion 22 joined to a front portion 24. Joined by pin 66 on two sides are retaining springs 60 whose functions will be described later.

The front portion 24 of the frame has connected thereto two parallel bearing members 26 which are generally orientated in a fore and aft direction. The rear portion 22 of the frame 20 is covered by an appropriated padding material 28 and the front portion 24 of the frame is enclosed by an appropriate bellows cover 29.

Fronting the frame 20 is a cushion support 40. The cushion support 40 provides a cranial contact surface 41 for the seat occupant. The cranial contact surface 41 is covered with an appropriate padding material 42. The cushion support 40 also has fixably attached in parallel fashion two shafts 30. The shafts 30 are slidably mounted within the bearings 26. Each shaft 30 has a series of generally transverse slots 32 which have a unidirection incline cam surface 34. The rearward end of the shafts is connected to a flange member 36 which joins the shaft members together. Flange 36 also has lateral plates 80 with inclined ramp surfaces 82.

Pivotally connected along the front portion 24 of the frame are key levers 70. The key levers 70 are biased downward by a leaf spring 72.

In operation to adjust the vehicle seat headrest 7 vertically upward, the post 10 is displaced to the vertical position desired for the adjustment mechanism 19 to project into the desired slot 18. To adjust the angular orientation of the headrest the frame 20 is twisted to the place in the angular orientation desired by movement of bearing 14 on the circular end 13 of the cross bar 12.

In the position illustrated in FIG. 4, the cushion support is in its rearmost position with respect to the frame 20. Captured between the flange 36 and circling each shaft 30 is a coil spring means 50 which biases the cushion support to the rearward position. Two key levers means 70 are pivotally connected to the frame via pin 75 (FIG. 3) and are biased downward by leaf spring 72 to engage with slot 32a of each of the shafts 30.

Studs 46 connected with the cushion support 40 extends through openings 23 of the front portion 24 of the frame to contact the retaining springs 60 and push it rearward from its natural free-state position. To adjust the cushion support 40 forward, the vehicle seat occupant pull on the cushion support 40 causing the levers 70 to ride up surfaces 34 of slots 32a. The levers 70 will ride on the top of shafts 30 until the next detented slot 32b is reached whereupon the levers will be forced down again by leaf spring 72. The placement of the levers in the various slots 32 provide the incremental positional adjustment of the vehicle seat headrest 7 in the fore and aft direction.

Since surface 37 of slot 32 is not inclined, the shaft 30 will not be able to move rearward after the lever has dropped into the slot 32. However, the incline surface 34 allows the levers to be removed when pulling forward on the cushion support 40. Adjustment of the cushion support in a forward direction serves to compress the coil springs 50 and store energy within the springs.

Figure 5:
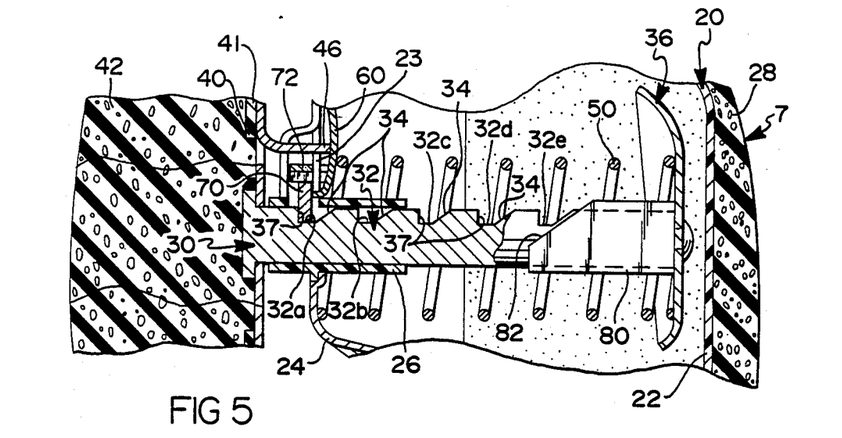
FIGS. 5 and 6 are views similar to that of FIG. 4 with portions removed for clarity of illustration, showing operation of the headrest when the cushion support is in the extreme rearward and forward positions respectively.
Figure 6:
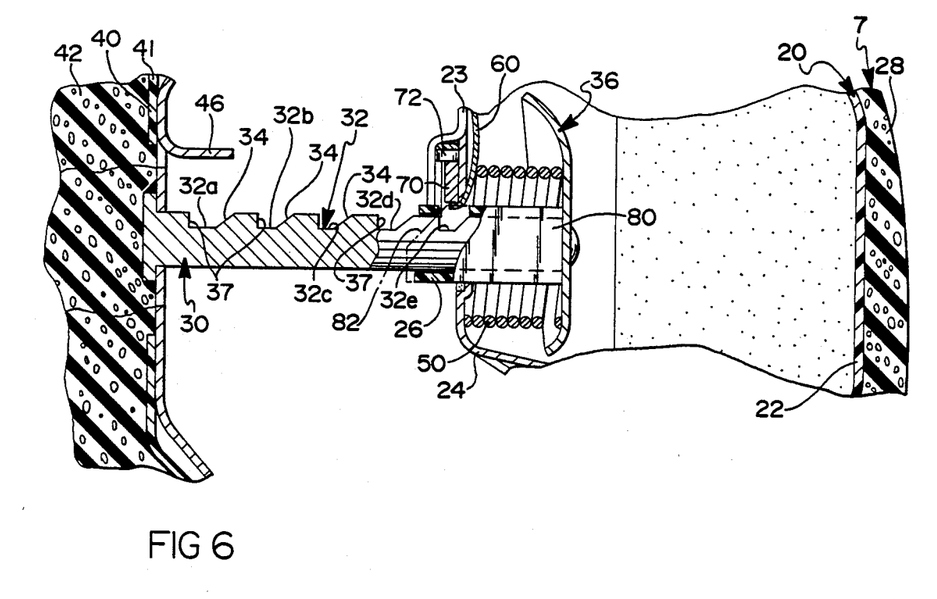
Figure 7:
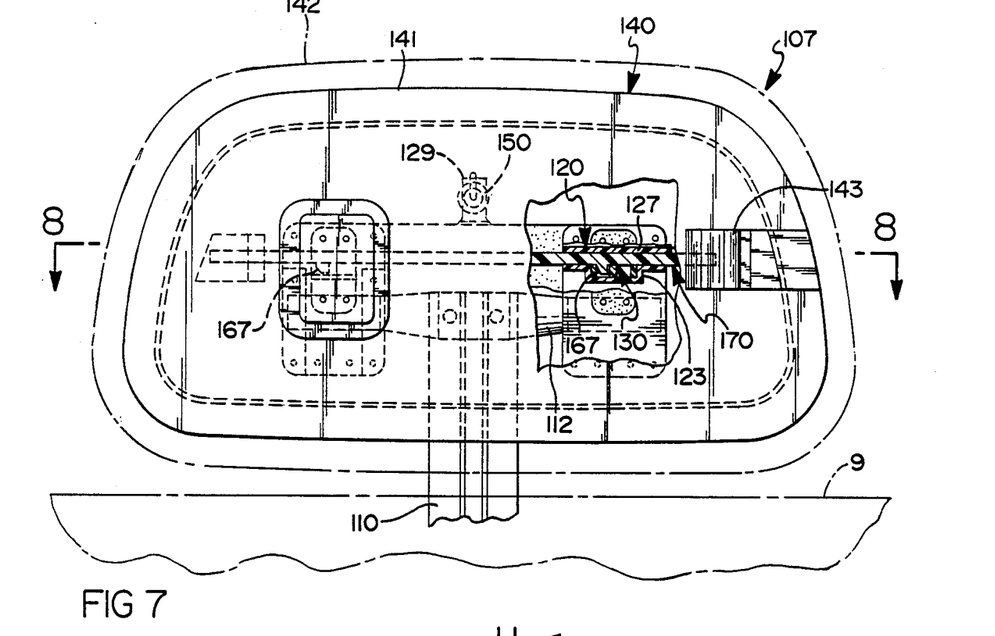
FIG. 7 is a sectional view mainly in front elevation of an alternative preferred embodiment vehicle seat headrest according to the present invention.

Referring in more details to FIG. 6, as the cushion support 40 is moved the forward extreme position, the ramp surface 82 guides the levers 70 upward to a vertical extreme position. At this point, the vehicle seat occupant will let go of the cushion support 40 and the coil spring 50 will urge the cushion support rearwardly. The levers will not fall back into the slots 32 since they are held up by retaining springs 60, which provides the release means to remove the levers from reengagement with the slots 34. The cushion support will continue to move back rearwardly until the stud 46 hits the retaining spring 60 causing the spring 60 to be displaced rearwardly thereby releasing the levers 70 so that they may be urged downward by leaf spring 72 in the foremost adjustment slots 32, as illustrated in FIG. 5. The vehicle seat headrest 7 is now reset in an extreme rearward position.

Referring additionally to FIGS. 7–12, an alternative preferred headrest 107 embodiment of the present invention is brought forth. The padded covering 142 is shown in phantom only. The construction of the headrest 107 of FIGS. 7–12 lends itself to fabrication from a polymeric material such a thermoplastic. A post 110 in a manner similar to the prior embodiment is vertically adjustable into the vehicle seat 9. The post 110 is integrally connected with a side bar 112. The frame 120 is angularly frictionally mounted on the side bars 112 by a clip 114. The frame has a lower portion 123 joined by connectors 125 with an upper portion 127. Slidably mounted between the upper 127 and lower 125 portions of frame 120 is a lever slider bar 170. The slider bar 170 has a front ramp surface 173 and rear ramp surface 174.

The slider bar 170 has 2 tabbed finger lever 172. Each lever 172 can by deformation pivot with respect to the slider bar 170. The lever 172 also has a cam surface 175.

Figure 8:
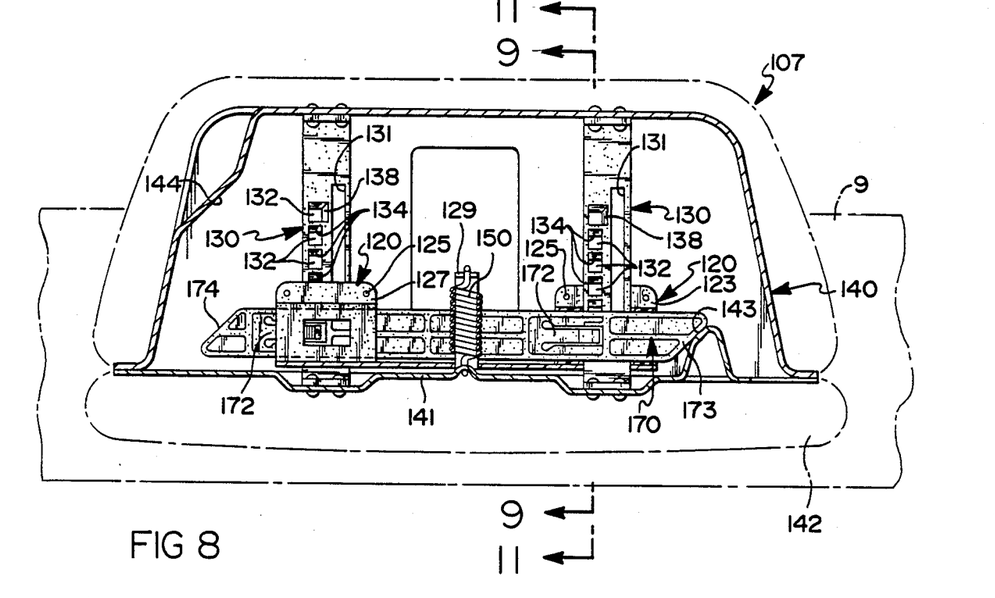
FIG. 8 is a view along line 8—8 of FIG. 7.
Figure 9:
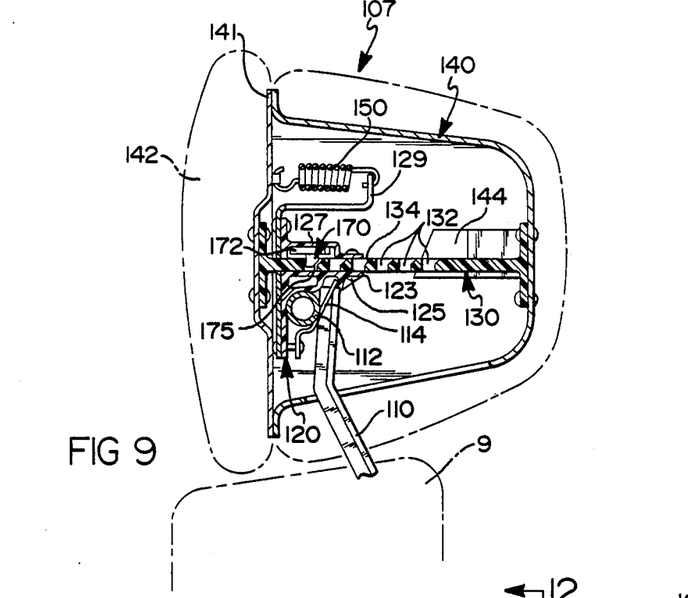
FIG. 9 is a view along line 9—9 of FIG. 8.

The cushion support 140 cranial contact surface 141 has fixably attached thereto two shafts 130. The shafts 130 each have a series of longitudinally spaced unidirectional cam slots 132 along with a free running longitudinal slot 131. The slots 132 have a inclined surface 134. The most rearward slot 132 also has a lateral cam surface 138 (FIG. 8). The cushion support 140 also has a forward ramp surface 143 and a rearward ramp surface 144. Between the cushion support cranial surface 141 and a frame extension 129 (FIG. 9) is a spring 150 for biasing the cushion support 140 to a rearmost position.

In operation the levers 172 are adjusted within one of the slots 132 of the shafts 130 to set the fore and aft position of the cushion support. In the extreme rear position (FIGS. 8, 9, and 11) the levers 172 will be in the most forward slot 132 of the shafts. Ramp surface 143 and 173 will be adjacent one another. As the cushion support 140 is pulled forward levers 172 will be cammed upward by virtue of the contact between inclined surfaces 175 and 134. Levers 172 will spring down in the adjoining slots 132. Only forward movement of cushion support 140 will be allowed since rearward movement will force surface 179 of the lever 172 against wall 137 of slot 132. As the cushion support 140 is continually adjusted forwardly to an extreme forward position to the last slot 132.

Figure 10:
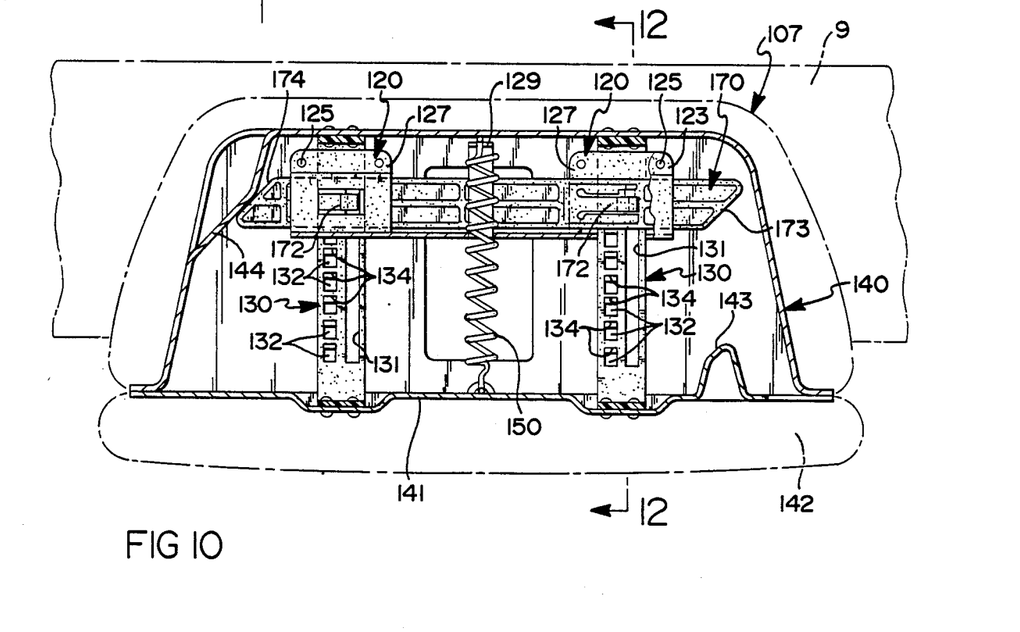
FIG. 10 is a top sectional view shown mainly in top plan of the vehicle seat headrest shown in FIG. 8.
Figure 11:
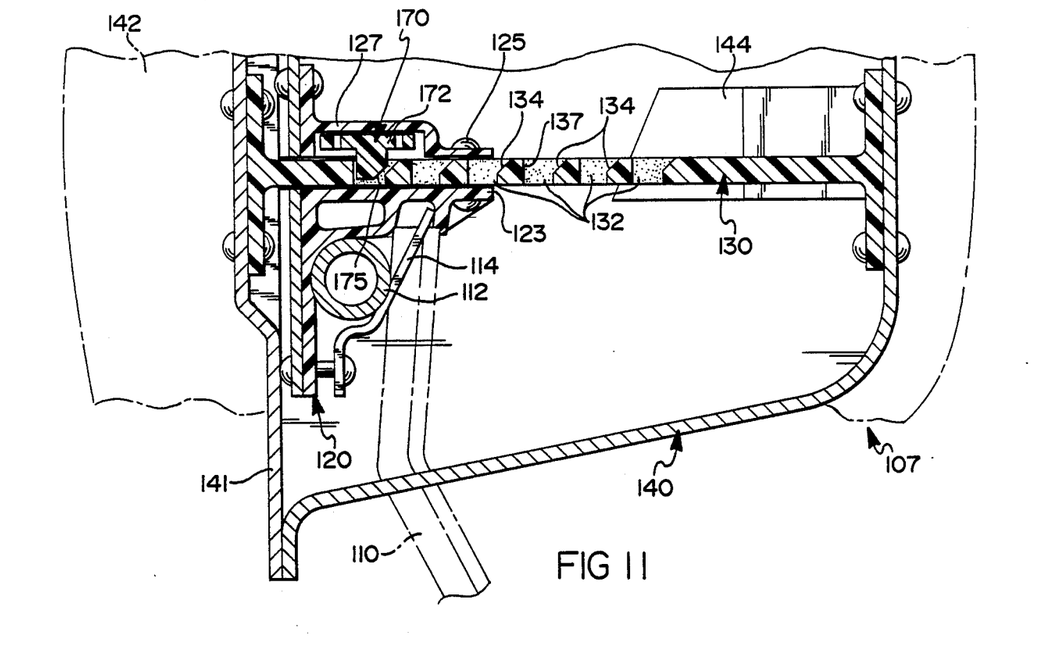
FIG. 11 is an enlarged view taken along line 11—11 of FIG. 8.
Figure 12:
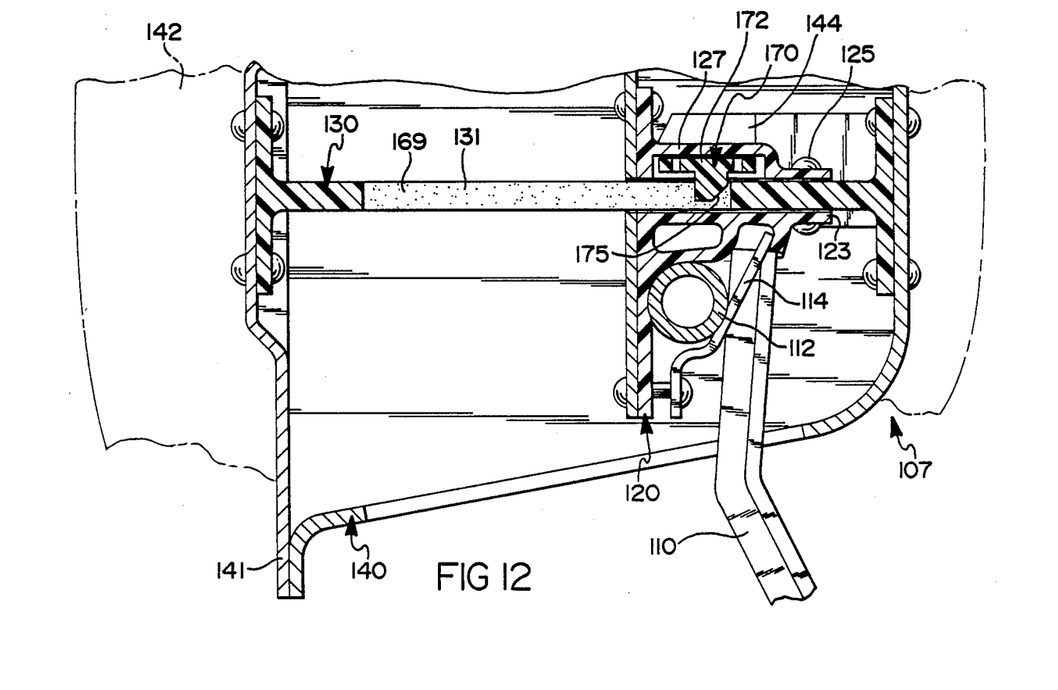
FIG. 12 is an enlarged view taken along line 12—12 of FIG. 10.

Pulling the cushion support forward from the position of the last slot 132 will cause the rear ramp surfaces 144 and 174 to contact. The contact of ramp surfaces 144 and 174 will cause the slide bar 170 to be pushed to the right (FIG. 10). Also lever 172 will be pushed against cam surfaces 138 and 134 of the last slot 132. The sideward movement of slide bar 170 will cause the levers 172 to engage into slots 131. The above will allow the spring 150 to return the cushion support 140 to its rearmost position after release by the seat occupant. As the cushion support returns to the rearmost position surfaces 173 and 143 will contact ramp to move the slide bar 170 over to the left. The levers 172 have a side cam surface 167 (shown best in FIG. 7) which will contact the left side wall 169 of slot 131. Continued leftward movement of slide bar 170 will cause the levers 172 to be cammed out of slots 131 and to reengage into slots 132 of the shafts. The cushion support is now adjusted back in its prior position.

The present invention provides a method of adjusting the fore and aft position of a vehicle seat headrest 7 with respect to a vehicle 9, the method including the following steps:

1. Connecting a base 10 of the headrest with the vehicle seat 9;
2. Connecting a headrest frame 20 with the base 10;
3. Slidably mounting to the base 10 a cushion support 40 having an attached shaft 30, the shaft 30 having a series of unidirectional cam slots 32;
4. Biasing the cushion support 40 to a rearward position with respect to the frame 20;
5. Connecting with the frame lever means 70 for engagement with the shaft cam slots 32 to set the fore and aft position of the cushion support 40;
6. Releasing the lever 70 from engagement with the cam slots 32 and retaining from reengagement therewith upon extreme forward movement of the cushion support 40 thereby allowing the cushion support 40 to be returned to an extreme rearward position; and
7. Reengaging the lever 70 with the cam slots 32 whereby the cushion support 40 is reset in an extreme rearward position.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A manual fore and aft longitudinally adjustable vehicle seat headrest, said headrest in combination comprising:

a base providing means of attachment of said headrest to said vehicle seat;
   a frame connected with said base;
   a cushion support providing a cranial contact surface, said cushion support further including an attached shaft, said shaft being slidably mounted with said frame for forward and rearward movement, said shaft having a series of unidirectional cam slots;
   spring means biasing said cushion support to an extreme rearward position with respect to said frame;
   lever means connecting with said frame for engagement with said shaft slots to set the position of said headrest;
   release means to remove said lever and retain said lever from reengagement with said slots upon extreme forward movement of said cushion support thereby allowing said spring to return said cushion support to said extreme rearward position;
   means to reengage said lever with said slots whereby said cushion support is reset in said extreme rearward position.

2. A vehicle seat headrest as described in claim 1 wherein said frame is pivotally mounted with respect to said base.

3. A vehicle seat headrest as described in claim 2 wherein said base means is adjustable generally vertically with respect to said vehicle seat.

4. A manual 6-way adjustable headrest for a slotted vehicle seat, said headrest in combination comprising:

a post providing means of attachment of said headrest to said vehicle seat, said post being vertically adjustable within a slot of said vehicle seat;
   a frame pivotally connected with said post by a friction pivotal adjustment means, and said frame having two generally parallel bearings projecting in a fore and aft direction;
   a cushion support providing a cranial contact surface, said cushion support further including two parallel attached shafts slidably mounted within said frame bearing, each of said shafts having a series of inclined cam slots and a flange;
   a coil spring surrounding at least one of said shafts and captured between said shaft flange and said frame for biasing said cushion support to an extreme rearward position;
   two key levers pivotally connected with said frame for engagement with said slots to set the position of said cushion support with respect to said frame;
   a ramp connected with a portion of said cushion support to remove said lever from engagement with said slots upon extreme forward movement of said cushion support;
   a retaining spring to retain said lever in a position of non engagement with said slots upon extreme forward movement of said cushion support thereby allowing said cushion support to returned to an extreme rearward position by said coil spring; and
   a stud to release said retaining spring from said lever upon said cushion support returning to an extreme rearward position allowing said lever to reengage with said slots whereby said cushion support is reset in an extreme forward position with respect to said frame.

5. A fore and aft adjustable vehicle seat headrest, said headrest in combination comprising:

a base providing means of attachment of said headrest to said vehicle seat;
   a frame connected with said base;
   a cushion support providing a cranial contact surface, said cushion support further including an attached shaft said shaft being slidably mounted to said frame for forward and rearward movement, said shaft having a series of unidirectional cam slots and a longitudinal slot, and said cushion support having attached thereto front and rear ramp surfaces;
   spring means biasing said cushion support to a rearward position with respect to said frame;
   lever means having front and rear ramp surface, said lever being slidably connected with said frame for engagement with said shaft unidirectional slots to set the position of said headrest whereby movement of said cushion support to an extreme forward position causes said lever to be disengaged from said unidirectional slots and for said cushion support rear ramp surface to engage with said lever front ramp surface to move said cushion support cause said lever to be placed into said longitudinal slot allowing said spring to position said cushion support in an extreme rearward position whereupon said cushion support front ramp surface engages with said lever front ramp surface to move said cushion support to a position wherein said lever reengages with said unidirectional slots whereby said cushion support is reset in said extreme rearward position.

6. A cushion support as described in claim 5 wherein said frame is pivotally mounted with respect to said base.

7. A cushion support as described in claim 5 wherein said shaft of said cushion support is fabricated from a polymeric material.

8. A method of longitudinally adjusting the fore and aft position of a vehicle seat headrest with respect to a vehicle seat, said method in combination comprising:

connecting a base of said headrest with said vehicle seat;
connecting a headrest frame with said base;
slidably mounting to said base a cushion support having an attached shaft, said shaft having a series of unidirectional cam slots;
biasing said cushion support to a rearward position with respect to said frame;
connecting with said frame lever means for engagement with said shaft cam slots to set the fore and aft position of said cushion support;
releasing said lever from engagement with said cam slots and retaining from reengagement therewith upon extreme forward movement of said cushion support thereby allowing said cushion support to be returned to an extreme rearward position; and
reengaging said lever with said cam slots whereby said cushion support is reset in an extreme rearward position.

* * * * *